US007809464B2

(12) United States Patent
Owen

(10) Patent No.: US 7,809,464 B2
(45) Date of Patent: Oct. 5, 2010

(54) REGISTRATION SYSTEM FOR SHEET FED PROCESSING MACHINES

(75) Inventor: Mike Owen, Richmond, VA (US)

(73) Assignee: Mikowen Industries, LLC, Richmond, VA (US)

( * ) Notice: Subject to any disclaimer, the term of this patent is extended or adjusted under 35 U.S.C. 154(b) by 799 days.

(21) Appl. No.: 11/388,279

(22) Filed: Mar. 24, 2006

(65) Prior Publication Data

US 2007/0222142 A1 Sep. 27, 2007

(51) Int. Cl.
*G06F 19/00* (2006.01)

(52) U.S. Cl. ....................... 700/192; 101/183; 101/486; 377/17; 271/11; 271/53; 271/153; 271/254; 271/256; 270/22.1; 270/30.04

(58) Field of Classification Search ................. 700/192; 271/256; 270/22.1, 30.04; 377/17
See application file for complete search history.

(56) References Cited

U.S. PATENT DOCUMENTS

| | | | | |
|---|---|---|---|---|
| 5,383,392 | A * | 1/1995 | Kowalewski et al. | 101/183 |
| 5,768,959 | A * | 6/1998 | Lorenzo | 83/74 |
| 5,771,811 | A * | 6/1998 | Siler et al. | 101/486 |
| 5,793,397 | A * | 8/1998 | Barker et al. | 347/88 |
| 5,917,727 | A * | 6/1999 | Richardson et al. | 700/223 |
| 6,714,758 | B2 * | 3/2004 | Miyamoto et al. | 399/384 |

* cited by examiner

*Primary Examiner*—Albert DeCady
*Assistant Examiner*—Olvin Lopez
(74) *Attorney, Agent, or Firm*—Thomas, Karceski, Raring & Teague, P.C.

(57) ABSTRACT

The invention relates to a registration system for sheet fed processing machines that reduces or eliminates the need to calibrate the register and/or timing dials of such a machine. The system uses known measurements and the elapsed time between electrically generated pulses to determine the relative position of processing cylinders in the machine relative the timing of a feed mechanism. The relative positions are displayed in real-time and can be adjusted by an operator. The machine need not be 'in time' to properly register the machine.

7 Claims, 2 Drawing Sheets

REGISTRATION SYSTEM FOR SHEET FED PROCESSING MACHINES

FIELD OF THE INVENTION

The present invention relates to a registration system for sheet fed processing machines and, more specifically, to a registration system that reduces or eliminates the need to calibrate the timing and register dials of a sheet fed machine or to place the machine 'in time'. The invention is suitable for use with sheet fed processing or printing machines such as corrugated sheet printing machines.

BACKGROUND

Sheet fed machines, such as corrugated sheet printing machines, consist of multiple operating sections. The operating sections will typically include a feed section and one or more processing sections, such as a print section(s), a die cutter section, a slotting section, and the like. The actual specific number and types of sections will depend on the task that is being performed. Each operating section includes a pair of cylinders where each cylinder in the pair rotates in opposing directions. In the processing sections, at least one cylinder (the "processing cylinder") includes a tool.

The term "registration" is commonly used in the relative technical fields to mean the proper alignment of various plates, cylinders, or the like to assure clear and accurate reproduction and manufacturing of a sheet or web. For a sheet fed machine, registration can be defined as the control and alignment of the machine's processing cylinders to provide consistent and accurate printing, cutting, slotting, and/or other process on the processed sheet. A common gear train links the cylinders in the operating sections. The processing cylinders have register or compensator motors that rotate the cylinders without rotating the gear train in order to register the cylinders.

In reference to corrugated sheet printing, the machines are largely responsible for converting a corrugated sheet into a more aesthetically pleasing and marketable product, such as boxes with printed images. Corrugated sheets, in general, are paper or plastic sheets that consist of multiple layers. Most commonly, there are two flat, outer layers sandwiched around at least one inner layer. The inner layer(s) is corrugated, meaning it is shaped into alternating parallel grooves and ridges. The wave-like pattern of the middle layer(s) (i.e., the alternating ridge/groove shape) provides adhesion or connection points at the apex of the ridges and grooves to be joined to adjacent flat panel layers. Adhering or joining a lone middle layer to the two outer layers would form a corrugated sheet with a single inner layer. Intermediate flat layers could be used where there is a plurality of inner corrugated layers.

A feed mechanism advances a new sheet into the machine. Often, a stack of sheets is placed on the feeding unit or mechanism wherein the bottom sheet is propelled into the printing machine. Some feed units are capable of feeding two sheets per machine revolution, but it is more common that a single sheet is inserted. Each sheet is advanced so that it engages the cylinders of the feed section. The specific angular position of the cylinders in the feed section at the time of contact with the individual sheets is unimportant. However, the sheets should be delivered to the processing cylinders so that each sheet reaches the processing cylinders when they are at a specific angular position. The position is critical as it determines where the tool on the cylinder engages the sheet as the sheet passes between the cylinder pair. When properly registered, the sheet reaches the processing cylinder pairs so that any printing, cutting, or other processing on the sheet is properly located on the sheet.

The registration, however, often requires adjustment for a variety of reasons. For example, after a finite production run of sheets, the machine must be opened and new print plates and die boards attached to the processing cylinders in accordance with the specific specifications of the next production run. This requires an operator to rotate the cylinders within the machine without rotating the gear train. The cylinder must be returned exactly to the previous position to "re-register" the machine. However, the print plates are not uniformly sized and may be mounted improperly.

A more significant problem occurs when the operator rotates the gear train to move a specific cylinder. The gear train of a section is disconnected from the adjacent sections when the machine is open. When the operator moves the gear train for one section, it becomes tedious and/or difficult to accurately mesh the gear train back together to the exact location as it was before. This problem is well known in the art of sheet fed machines because moving the gear train typically results in the machine being "out of time." The initial registration is almost random when the machine is out of time and will likely require many more adjustments to reach the proper registration.

As an illustration of registration, consider the example of a sheet measuring 20 inches by 20 inches that might need to have a simple image printed in the center of the sheet and then to be cut into the shape of a circle wherein the printed image is in the center of the resulting circle. Sheets would first be stacked onto or otherwise provided to the feed mechanism. A print plate with the desired image and color would be mounted onto one of the print sections (plates in additional print section would be used to blend colors, add secondary images, or the like). A die board is mounted onto the die cylinder, and the die board would have a knife for cutting or scoring a circular shape into the sheet. The machine is started, and the sheets are individually fed into the machine. There is almost always some level of registration error. The machine is properly registered when the image is placed in the appropriate position so that when the sheet is cut the image is in the middle of the circle.

In known registration systems, in order to achieve a properly registered product, the print cylinder and die cylinder would be adjusted by means of an electric motor (commonly referred to as a register motor or compensator motor). The function of this motor is to adjust the rotational position of the cylinder at the time when the cylinder pair engages a sheet fed by the feed mechanism. A register dial rotates with the cylinder to give a visual indication of how much rotational movement of the cylinder has occurred (encoders can replace the dial to give an electronic indication). Each section is equipped with a "timing dial" or digital readout of each section's relative gear train position. If the gear train of a section is moved independently, the timing dial and register dials move. By changing the relative position of a print cylinder, die cylinder, or slotting cylinder relative to gear train and/or by changing the relative position of a section's gear train relative to other gear train sections, it is possible to register a particular product to the desired specifications.

Currently, registration is accomplished by processing sheets in the machine and then making adjustments as necessary based on the error found in the resulting product. Using the above example, if the first sheet produced by the machine includes an image that is 6" away from the center of the circle, the operator would adjust the register on the print cylinder to advance or retard the print on the sheet. The same could be done to the die cylinder, if necessary. For example, the die cylinder would need to be adjusted in the event that the circle was truncated because the knives were not properly falling within the area defined by the sheet.

The known registration techniques obviously require the operator to inspect the end product and then to walk to the unregistered processing section in order to adjust the dials. The adjustment is usually an estimate meaning multiple runs are required to perfect the registration. Multiple processing sections may require registration. This is a time consuming and wasteful process.

A machine is thought to be “in time” when it is possible to set the register dials to zero (which indicates the position of the processing cylinders relative to the corresponding section’s gear train), to have all the timing dials at zero (which indicates the section’s gear train position relative to other sections’ gear train position), and have the first sheet fed into the machine such that the sections print, die cut, and/or slot the sheet in a manner that is reasonably close to what the manufacture intended. Many variables, as known to those in the art, make it nearly impossible to have a first sheet exactly right even with the machine is in time.

For instance, the timing and register dials inherently provide poor resolution, are subject to human error, or are generally not accurate. If the machine is “out of time” (meaning the timing dials are not properly calibrated), the process of finding the correct registration becomes almost random since there is no reasonable way to know the rotational position of each cylinder relative to the sheet feeding mechanism. It may be necessary to open the machine and adjust the gear train until the machine is ‘in time’.

Web-based machines, for various reasons, allow for automatic registration and pre-registration of machines, but this has not been accomplished in sheet fed machines. Registration systems for sheet fed machines rely on encoders, which are geared electrical devices that generate signals that can be decoded to determine a relative angular position of a cylinder. These systems require periodic human “referencing” since they tend to lose signal pulses or generate false pulses. Very importantly, encoder-based systems do not account for a machines gear train being out of time. The gear train can be moved without the encoder knowing that the position of the cylinder relative to other sections has been changed by the amount of rotational movement that occurred in the gear train. Even fractions of an inch render the machine out of time, and the position reported by the encoder is completely inaccurate.

Known systems cannot track, record, or use the elapsed time between various sensor signals generated from the sections of the machine. The ability to rely on elapsed time between the various sensor signals in order to determine the relative positions of each cylinder would be advantageous. Manufacturing inconsistencies, human error in mounting the flexible plates or boards on the cylinders, and other factors that are specific to sheet fed machines create unique challenges for registering sheet fed machines.

Therefore, there exists a need and a challenge to create a registration system for sheet fed machines, such as corrugated sheet printing machines that provides a very simple and economical way to display the current relative positions of each cylinder. Ideally, such a system would allow a sheet fed machine to be registered even without the machine being “in time” and would be operable to display a fixed point on each cylinder relative to the feed mechanism. As such, calibration of the time/registration dials is effectively eliminated. The ability to perform manual registration adjustments would be provided. The registration system would provide the relative position of the cylinders relative to the timing of a sheet feed mechanism using elapsed time. The registration system of the present invention solves one or more of these or other needs.

SUMMARY OF THE INVENTION

In accordance with the present invention, a registration system for sheet fed machines that eliminates the need for timing and/or register dials and further eliminates the need to place a machine ‘in time’ is provided. The sheet fed machine includes common or known tools such as a sheet feed mechanism, a feed section, and one or more processing sections for processing the sheets. Each section consists of a pair of cylinders. The typical processing sections include printing, cutting, slotting, or similar operations. Not including the feed section, the registration system provides a visual indication of the relative positions of the processing section cylinders compared to the timing of the sheet feed mechanism.

The system of the present invention comprises a computer, a display device, switches for actuating register motors or to otherwise change the angular displacement of the processing section cylinders, and sensors located in each processing section of the sheet fed machine. The sensors generate a pulse for each rotation of a corresponding processing cylinder. In a preferred embodiment, each sensor detects the presence of a target that is mounted to the corresponding processing cylinder as the target passes the sensor. The sensor creates an electronic pulse when the corresponding target is detected. Each sensor, therefore, provides one electrical pulse per revolution of the machine. An additional sensor monitors the feed mechanism. The feed mechanism sensor provides one pulse to mark the insertion of a sheet into the machine.

The computer uses the known (programmed) circumference of the machine processing cylinder(s) and the timing of the sensor pulses in order to calculate the speed (angular velocity) of the machine by counting the amount of time between each pulse generated by the sensor. This solves the equation: Speed=Cylinder circumference (inches)/Period between pulses (seconds) wherein the period is the elapsed time between the pulses generated by any one sensor. The speed value is recorded in memory.

The computer also records or monitors the pulse from the feed mechanism sensor and begins counting the elapsed time from the feed mechanism pulse until the pulse produced by each of the processing section sensors. The computer calculates the time between each section’s sensor pulse and the feed mechanism sensor pulse on every rotation of the machine. The computer then calculates the relative position of each cylinder by solving the following equation:

$$P=\Delta T\text{ (seconds)}*\text{Speed (inches/second)}+\text{Adjustment Factor (inches)}$$

where P=relative position; ΔT=elapsed time from feeder mechanism pulse to a section generated pulse; Speed=the stored value as calculated above; and Adjustment Factor=the fixed distance between the axis of a processing cylinder to the axis of any adjacent processing cylinder plus/minus an error adjustment.

The system is a time-based application in that it has the ability to track the elapsed time between the various sensor pulses in order to determine the relative position of each cylinder in comparison to the feed mechanism. The relative position is displayed to a machine operator. Adjustments to the angular displacement/rotational position of the cylinder are manually accomplished via the registration system. An operator views the position of any processing cylinder and can quickly and efficiently adjust the registration of the machine even when the machine is 'out of time'.

A registration system for a sheet fed machine in accordance with the present invention efficiently addresses at least one of the shortcomings associated with prior art. The foregoing and additional features and advantages of the present invention will become apparent to those of skill in the art from the following detailed description of a preferred embodiment taken in conjunction with the accompanying drawings.

DETAILED DESCRIPTION

A registration system for sheet fed machines in accordance with the present invention provides relatively simple, inexpensive, and robust means to quickly and accurately adjust the registration of the sheet fed machine even when the machine might be out of time. Sheet fed machines are known generally, and the sheet fed machine configurations discussed herein are not intended to limit the present invention. Moreover, as the general operation of such a machine is well understood by one of skill in the art, specific descriptions of the gear train, motors, or general operation and structure of the machine have largely been omitted. The registration system of the present invention hastens and improves upon the prior art registration techniques. It is a time-based system. An auto-setup feature stores operator preferences for later viewing to pre-adjust the registers. Further adjustment and registration is generally necessary.

Figure 1:
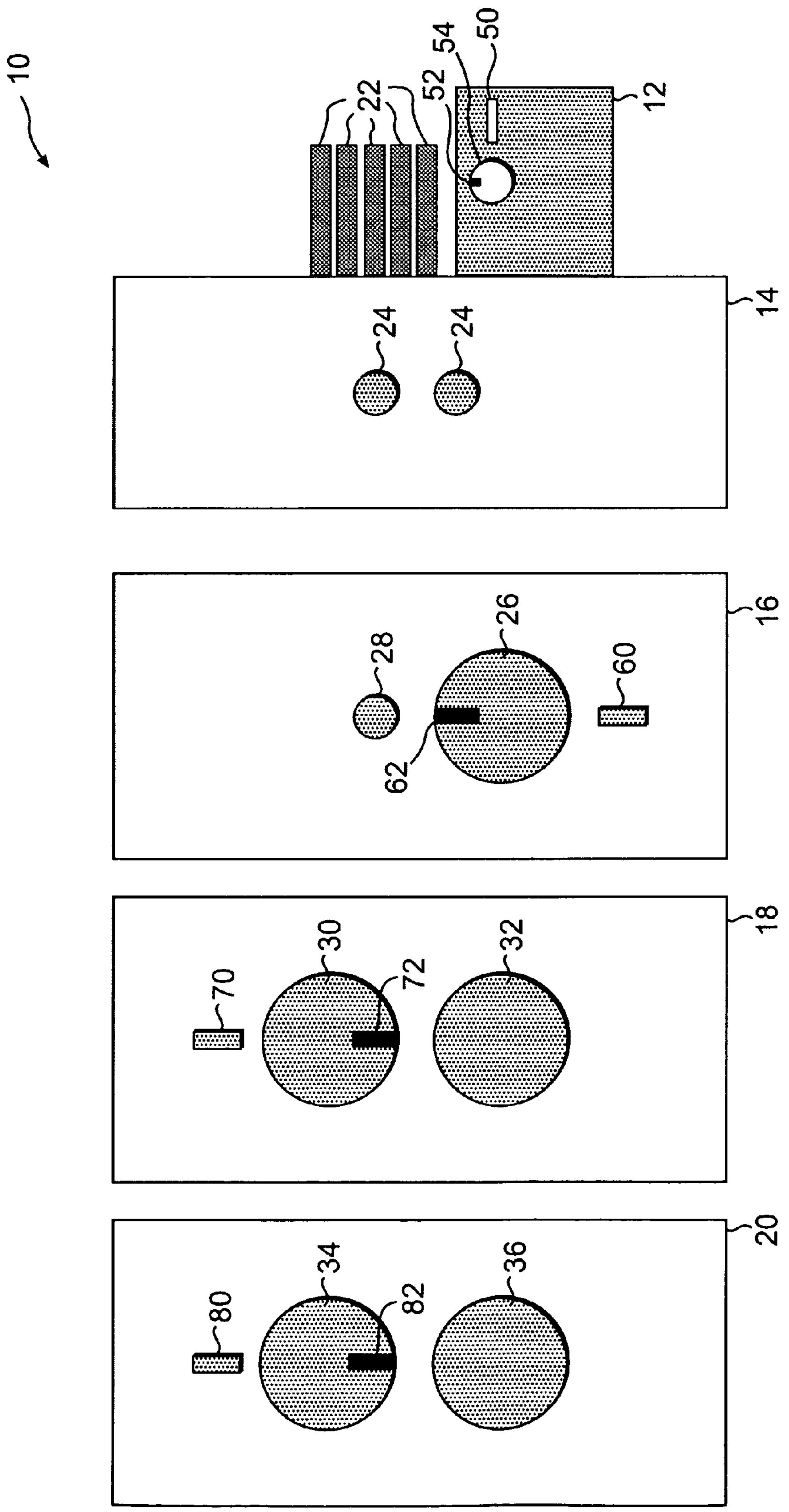
FIG. 1 is a diagraphical side view of a registration system for use with a sheet fed machine in accordance with one preferred embodiment of the present invention.

Turning to FIG. 1, there is illustrated a diagraphical side view of a sheet fed machine 10 and a feed mechanism 12. The machine includes a feed section 14 and processing sections 16, 18, 20. Feed mechanism 12 advances one of a plurality of sheets 22 into machine 10. Various types of feed mechanisms are known in the art and would be operable with the present invention. For simplicity, the feed mechanism will be discussed in terms of a cylinder-driven pickup apparatus that engages and injects a sheet 22 into machine 10.

Feed section 14 continues the movement of a sheet 22 from feed mechanism 12 and transfers a sheet 22 to the first processing section 16. The number of processing sections will vary, but sheet fed machine 10 might include processing sections that perform printing, cutting, slotting, and other manufacturing tasks. Each section of the machine includes two cylinders that propel the sheet. The space between the two cylinders accommodates the thickness of the sheet to be processed.

Except for feed section 14, at least one of the cylinders in each processing section 16, 18, 20 will typically include a tool to modify the sheet. The tool carrying cylinder is a processing cylinder. The successively fed sheets 22 are inserted so that these processing cylinders are at the same angular displacement or rotational position at the instance each leading edge of a sheet 22 enters machine 10. When properly registered, the tools on the processing cylinders perform their task on a sheet 22 in the proper location of the sheet.

Feed section cylinders 24 match the rotational speed of the processing cylinders so that a sheet is not pulled or placed under tension when transferring from feed section 14 to the adjacent processing section. However, feed section cylinders 24 have a different circumference size than the processing cylinders. Therefore, feed section cylinders are not registered and the leading edge of each sheet 22 does not engage the same point on the feed section cylinders.

Each sheet 22 moves from feed section 14 to the processing section 16. Processing section 16 can be a print or other processing section. There may be multiple print sections or no print sections in machine 10. In the case of a print section, a print cylinder 26 (the processing cylinder of the print section) is provided. A flexible printing plate (not illustrated) is mounted on print cylinder 16. A different printing plate is normally mounted for each production run. The secondary cylinder is an impression cylinder 28. As a sheet 22 passes between the print and impression cylinders, the printing plate transfers an image onto the portion of sheet 22 that contacts the plate. It is possible, in an unregistered system, for the printing plate to fail to contact the sheet at all in which case the relative position of print cylinder 16 would need to be drastically adjusted relative to the timing of feed mechanism 12. Print section 16 is properly registered when the print image is properly placed on a sheet 22.

The subsequent or following processing sections may perform numerous operations and the number of processing sections can vary greatly from machine to machine. The registration system of the present invention is operable with a wide range of sheet fed machine configurations, and the system is easy to retrofit to existing machines. Here, processing section 18 will be described as a cutting section and processing section 20 will be described as a slotting section.

Cutting section or die cut section 18 includes a die cylinder 30 onto which a die board (not illustrated) is mounted. The die board includes knives to cut sheets 22 into geometric shapes. The knives on the board come into contact with a cushion or soft material on an anvil cylinder 32. The distance between the two cylinders in the die cut section can be adjusted so that the knives or cutting mechanism enter the soft material on the anvil cylinder without damaging the anvil cylinder.

Slotting section 20 provides a slotting cylinder 34 with knives (not illustrated) mounted on the cylinder. The knives are aligned with matching openings, known as heads (also not illustrated) on the secondary or head cylinder 36. The matching units or heads (also not illustrated) receive the knives mounted on the slotting cylinder 34. The knives on a slotting cylinder cut or score sheets 22 in a single direction.

It is understood that the illustrated cylinders rotate by means of a single gear train, electronic line shaft (servo motors), or other motive source. Sheets 22 are pulled through machine 10 by this rotational movement. The cylinders in the feed and processing sections have the same angular velocity (speed). Because processing cylinders 26, 30, 34 shares a common circumference, each sheet will engage the processing cylinders at the same rotation point during any one production run. The actual engagement point on the individual cylinders is determined by the relative position of each cylinder relative to the timing of the feed mechanism.

To enable the registration of the system of the present invention, a feed mechanism sensor 50 monitors a target 52 mounted on a feed mechanism cylinder 54. Sensor 50 generates an electronic pulse as target 52 passes sensor 50. As known in the art, the cylinder selectively actuates a belt or other pick-up mechanism to insert a sheet 22. The time between each sheet being inserted typically corresponds to one complete rotation of the machine (i.e., one rotation of a processing cylinder). There are, however, feed mechanisms 12 that do not use a feed mechanism cylinder 54 to insert sheets 22. It is also known that a feed mechanism might insert more than one sheet per processing cylinder rotation. As such, the overall responsibility of feed mechanism sensor 50 is to detect the point in time that a sheet is inserted into the machine, with or without an associated target, and to generate an electronic pulse at that time. This can be accomplished via the target and sensor technique or through an optical device or other detection mechanism.

Sensor or detection tools are also placed in each processing section 16, 18, 20 to monitor the rotation of the processing cylinders 26, 30, 34. Print section 16 includes a print sensor 60 and a print target 62 that is mounted on print cylinder 26. Likewise, cutting and slotting sensors 70, 80 detect targets 72, 82 on the respective die and slotting cylinders 30, 34.

Figure 2:
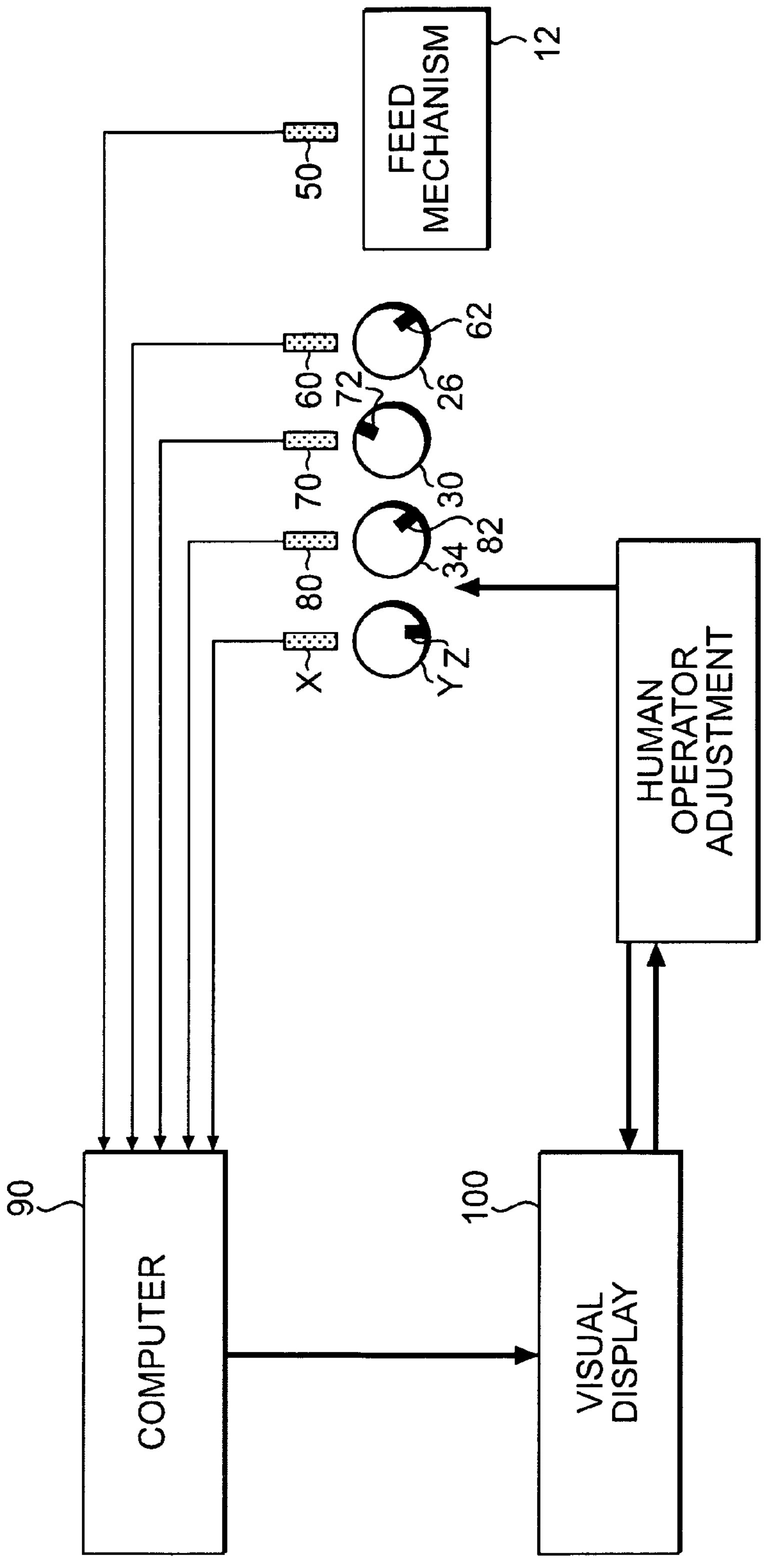
FIG. 2 is a flow chart depicting the process of the present invention in accordance with one preferred embodiment thereof.

Turning now to FIG. 2, a high level flow chart is illustrated that depicts the registration system of the present invention. A computer 90 is electrically connected to each sensor. Feed mechanism sensor 50 creates a pulse for each sheet inserted by feed mechanism 12 regardless of the specific type of feed mechanism. The sensor, in a preferred embodiment, monitors the feed mechanism in manner so that a pulse is generated one per revolution of the mechanism regardless of whether sheets are being fed to the machine or not. This allows the registration system to operate before sheets are inserted into the machine. Each section sensor creates a pulse when the corresponding target on the processing cylinder passes the sensor. A section with a sensor X, cylinder Y, and target Z is illustrated to reinforce the possibility of adding or subtracting additional sections.

The computer receives each electronic pulse, and it includes an internal clock that counts the time between the feed mechanism sensor pulse and each later pulse generated by the remaining sensors. Computer 90 also records the time between each feed mechanism sensor pulse. The frequency of the internal clock partially determines the accuracy of the registration system. In a preferred embodiment, the internal clock has a frequency of 80 million hertz.

An operator or registration system installer inputs or records into the registration system the circumference of the machine's processing cylinders. An adjustment factor must also be determined during installation of the system. The adjustment factor is the fixed distance from the axis of a processing cylinder to the axis of any adjacent processing cylinder plus/minus an error adjustment. The error adjustment accounts for the imprecise placement of the target onto the cylinder and other factors. The error adjustment will vary from installation to installation.

The error adjustment is determined by setting an in time machine's registration to the Original Equipment Manufacturer's ('OEM') published "zero" point. A test run with the sensors/targets in place is processed. The test run, including printing, cutting, and/or slots, is produced on one or more sample sheets. The error between the positions displayed by the system (as explained elsewhere herein) and the actual position of the test printing/cutting/slotting is the error adjustment. The adjustment factor is entered into the permanent memory of the computer for the purpose of calculating the relative position of each cylinder. The adjustment factor is determined and recorded for each machine section. The adjustment factor effectively forces the registration system to display the OEM published "zero" point (typically, but not always, zero position). After operating the system, whether in time or not, the system will display the actual position of the cylinders. As one of skill in the art will appreciate, knowing the actual position of each cylinder is significant for registering the system for a production run.

Computer 90 performs several calculations based upon the detected, recorded, and stored data. First, computer 90, during operation of the machine, computes the speed of the machine by solving the following equation:

Speed=Circumference (inches)/Period (seconds)
where 'period' is the time interval between the pulses sent by any one processing cylinder sensor. The speed of the machine is recorded and monitored.

The speed value is then used to derive the relative position ('P') of each monitored cylinder relative to the timing of the feed mechanism. The relative position is calculated as follows:

$P$=($\Delta T$ (seconds)*Speed (inches/second))+Adjustment Factor (inches)

where $\Delta T$ is the elapsed time from where the computer receives the pulse from the feed mechanism to when the computer receives the pulse from any section sensor.

The relative position is displayed to the machine operator via a computer monitor or other output device 100.

The human operator reads the displayed values and manually adjusts each cylinder, if necessary, through input devices provided by the registration system such as knobs, dials, touch-sensitive interface, or switches. The input devices are electrically connected to register motors (not illustrated) which delay or advance the processing cylinder the operator is adjusting. The effects of the adjustment are visible in real-time via the visual display 100. The registration system provides a central location to view and adjust the relative positions of the processing cylinders.

The registration system allows machine 10 to be opened for maintenance, to hang new flexible printing plates, die boards, or the like, or to otherwise be serviced without being concerned about re-calibrating the cylinders to a "zero" registration. It is now possible to close the machine with the cylinders and gear train in any position (i.e., potentially 'out of time') and still quickly register each processing cylinder from a central location. The relative positions can be viewed without running any sheets so that the cylinders can be adjusted in real-time. A test run will generally be necessary before the machine begins a production run in order to confirm that the view cylinder positions are properly registered.

The system is more accurate than encoder or dial registration techniques and further permits an operator to save the position of the cylinders with a file name that corresponds to a particular production run. The position numbers are independent of the machine gear train timing so that for future production runs, the machine can be registered to the recorded values, and the first sheet of a production run or a test run will be very close or perfectly produced as intended. This is true regardless of machine timing at the time of recording or recalling a job.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A registration system comprising:

a sheet fed machine, the machine including a feed mechanism, a feed section, and one or more processing sections, the one or more processing sections each including a pair of cylinders to modify and advance a sheet;

a computer;

an operator-visible information display operable to display data from the computer;

at least one user actuated mechanism for adjusting an angular displacement of a cylinder within each pair of cylinders;

a feed mechanism sensor associated with the feed mechanism, the feed mechanism operable to advance one of a plurality of sheets into the sheet fed machine, the feed mechanism sensor generating an electronic pulse by sensing a target associated with the feed mechanism;

a section sensor placed in the one or more processing sections;

a section target mounted to a cylinder in the pair of cylinders included in the one or more processing sections, the section sensor operable to detect the section target and to send an electronic pulse to the computer when the target is detected; and the computer 1) calculating a speed of each cylinder to which a section target is mounted and 2) tracking the elapsed time from receipt of the feed mechanism pulse to each processing section pulse, the computer then calculating the relative position of each cylinder with a target with respect to the electronic pulse generated by the feed mechanism sensor and displaying the relative position of each cylinder via the information display.

2. The registration system of claim 1, further comprising wherein the target associated with the feed mechanism is a feed mechanism target included in the feed mechanism, the feed mechanism sensor operable to detect the feed mechanism target and to send a feed mechanism pulse to the computer when the target is detected.

3. The registration system of claim 1, further comprising an input device and a registration motor, the input device actuated to control the registration motor, the registration motor operable to advance or retard a cylinder in the machine.

4. The registration system of claim 1, wherein computer calculations solve the following equations:

Speed=circumference/period; and

Relative position=$\Delta T$*Speed+Adjustment Factor where circumference=circumference of a cylinder to be monitored in inches; period=the elapsed time between sensor pulses generated by any one sensor; ΔT=the elapsed time between the pulse generated by the feed mechanism sensor and the pulse generated by a section sensor; and adjustment factor=the linear distance between the axis of any two adjacent monitored cylinders plus a known error adjustment.

5. A computer implemented method of registering a sheet fed machine, the method comprising:

inserting a sheet into the sheet fed machine via a feed mechanism; passing the sheet to a processing section, the processing section including a pair of cylinders to modify and advance the sheet in the sheet fed machine;

generating an electronic pulse from a feed mechanism sensor by detecting a target associated with the feed mechanism;

supplying an electronic pulse from a sensor located in the processing section of at least one cylinder in the pair of cylinders;

transmitting the electronic pulse from the feed mechanism sensor and the electronic pulse from the sensor located in the processing section to a computer;

calculating the elapsed time between the pulse generated by the feed mechanism sensor and the pulse generated by the sensor located in the processing section;

calculating a relative position of the at least one cylinder in the processing section relative to a feed mechanism cylinder;

the step of calculating the relative position of the at least one cylinder in the processing section relative to the feed mechanism cylinder further comprises the steps of 1) solving the equation: Speed=circumference/period; and 2) solving the equation: Relative position=AT*Speed+Adjustment Factor; where circumference=circumference of the at least one cylinder to be in inches; period=the elapsed time between sensor pulses generated by any one sensor; AT=the elapsed time between the pulse generated by the feed mechanism sensor and the pulse generated by the sensor located in the processing section; and adjustment factor=the linear distance between the axis of any two adjacent monitored cylinders plus a known error adjustment;

outputting the relative position of the at least one cylinder with respect to the feed mechanism cylinder via an operator-visible information display; and actuating a mechanism to adjust the relative position of the at least one cylinder within the pair of cylinders based upon the outputted relative position.

6. The method of claim 5, wherein the step of generating an electronic pulse from the feed mechanism further comprises the step of marking the point in time that a sheet enters the sheet fed machine, and the step of marking the point in time that a sheet enters the sheet fed machine further comprises detecting the target associated with the feed mechanism with the feed mechanism sensor operable to detect the target associated with the feed mechanism.

7. The method of claim 5, wherein the step of actuating a mechanism to adjust the relative position of the at least one cylinder within each pair of cylinders further comprises engaging a registration motor via an input device, the registration motor operable to advance or retard the relative position of the at least one cylinder.

* * * * *